Jan. 10, 1939. D. D. GOLDBERG ET AL. Re. 20,973

VALVE APPARATUS

Original Filed July 6, 1935 3 Sheets-Sheet 1

INVENTORS,
David D. Goldberg,
Haron R. Kligman,
BY
Walter C. Ross.
ATTORNEY.

VALVE APPARATUS

Original Filed July 6, 1935 3 Sheets-Sheet 2

INVENTORS,
David D. Goldberg,
Aaron R. Kligman,
BY
Walter C. Ross.
ATTORNEY.

Jan. 10, 1939. D. D. GOLDBERG ET AL Re. 20,973

VALVE APPARATUS

Original Filed July 6, 1935 3 Sheets-Sheet 3

INVENTORS,
David D. Goldberg,
Aaron R. Kligman,
BY
Walter C. Ross.
ATTORNEY.

Reissued Jan. 10, 1939

Re. 20,973

UNITED STATES PATENT OFFICE 20,973

VALVE APPARATUS

David D. Goldberg, Springfield, and Aaron R. Kligman, Indian Orchard, Mass., assignors to The Automatic Cone Valve Company, Indian Orchard, Mass., a corporation of Illinois Original No. 2,054,812, dated September 22, 1936, Serial No. 30,054, July 6, 1935. Application for reissue January 25, 1937, Serial No. 122,886

15 Claims. (Cl. 251—97)

This invention relates to improvements in valve apparatus and is directed more particularly to improvements in a valve having a plug adapted to function in a novel manner and operating means therefor.

One object of the invention is the provision of a valve apparatus in which a conical plug member is reciprocable in a body between seated or wedged and non-seated positions and is rotatable between open and closed positions all to the end that the said plug may be wedged or seated in the body in an open, closed or intermediate throttling position. The seating of the plug provides a tight metal to metal contact of the plug and body thereby to seal the plug and prevent fluid passing therearound which is likely to cause sticking of the plug, corrosion of the parts and other injurious effects.

As one special feature of the improved structure the plug is journalled or pivoted in the body at its upper and lower ends by means of journals which are relatively small in diameter in comparison to the diameter of the plug. Not only do the relatively small diameters facilitate free movements of the plug with a minimum of friction and operating effort but the plug is accurately guided in its reciprocating and rotative movements. This obviates a dragging tendency of the plug in the body such as would be brought about by unbalanced pressure at opposite sides of the plug tending to move the plug from its true axis of movement, all to the end that the co-acting seating parts of the plug and body are protected against injury and are at all times capable of providing a tightly sealed relation in all positions of the plug.

Another feature of the invention is the provision of means for reciprocating the plug between wedged or seated and non-seated positions and for rotating the plug between open and closed positions while in non-seated position. The said means is not only characterized by its simplicity and efficiency but is arranged to releasably lock the plug in a seated position.

Various other novel features and advantages of the invention will be hereinafter more fully referred to in connection with the accompanying description of the preferred form of the invention, reference being had to the accompanying drawings wherein.

Figure 1:
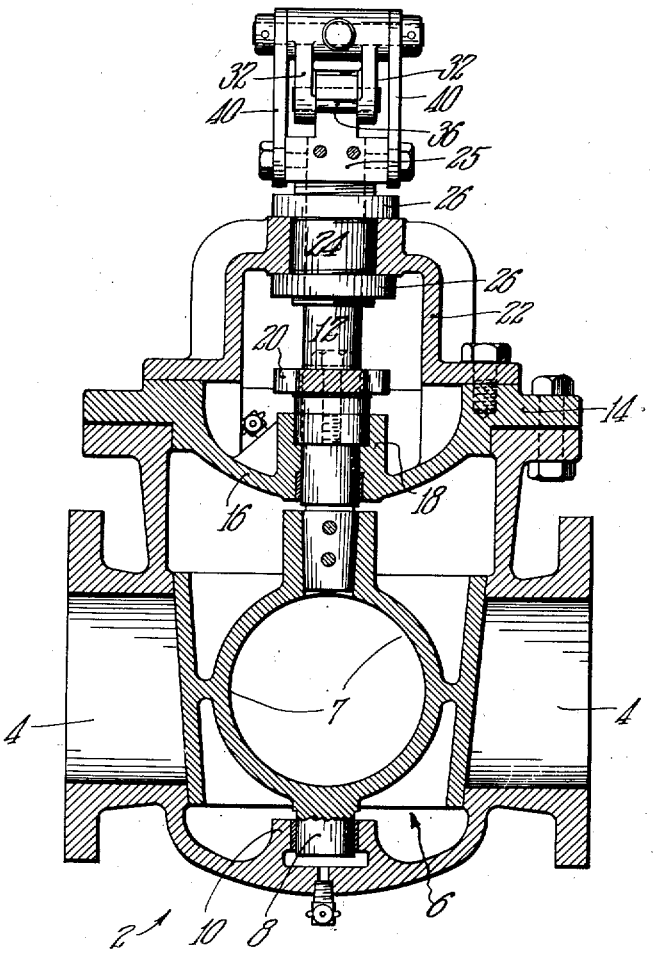
Fig. 1 is a sectional elevational view through a valve embodying the novel features of the invention.
Figure 4:
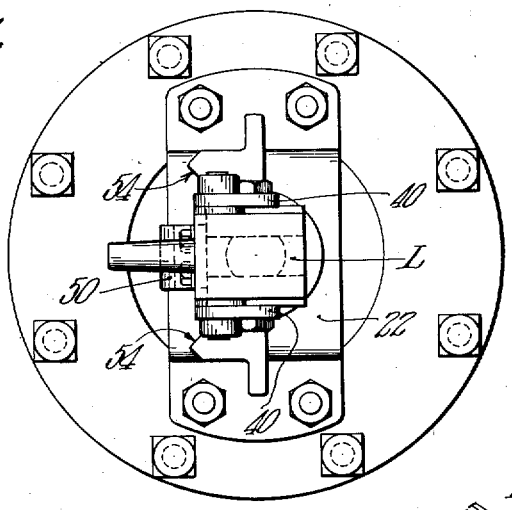
Fig. 4 is a plan view of the valve shown in Fig. 1.

Referring now to the drawings more in detail the invention will be fully described, it being understood that various changes and modifications may be made in the form of the valve without departing from the spirit and scope of the invention.

A valve body is represented at 2 having ports indicated at 4 and this body while it is shown as being of the flanged type may be of screw or bell-end type or be otherwise constructed for connecting the same to a pipe line.

A plug 6 is provided in the body which is preferably conical and it has as a special novel feature a lower journal or pivot part 8 that is mounted for rotation and reciprocation in a suitable hub or journal 10. A stem or spindle 12 which has its lower end fixed to the plug and as usual the plug has a passageway or opening 7 therethrough which is adapted to register with the ports of the body when in an open position.

A cap 14 is fixed to the upper side of the body and it has a transverse wall 16 and a bearing part 18 in which the stem 12 is mounted for reciprocation and rotation. A gland 20 is provided in connection with the bearing 18, as shown to provide a stuffing box for the stem and spindle and thereby properly seal the same but yet permit its rotation and reciprocation.

A yoke 22 is supported by and secured to the cap 14 and this has a sleeve 24 rotatable therein and adjustable up and down relative thereto. The sleeve is threaded adjacent its upper end and at its lower end and collars such as 26 are in threaded engagement therewith so that the sleeve may be moved up and down to various positions of adjustment and locked in place by the said collars 26.

Figure 2:
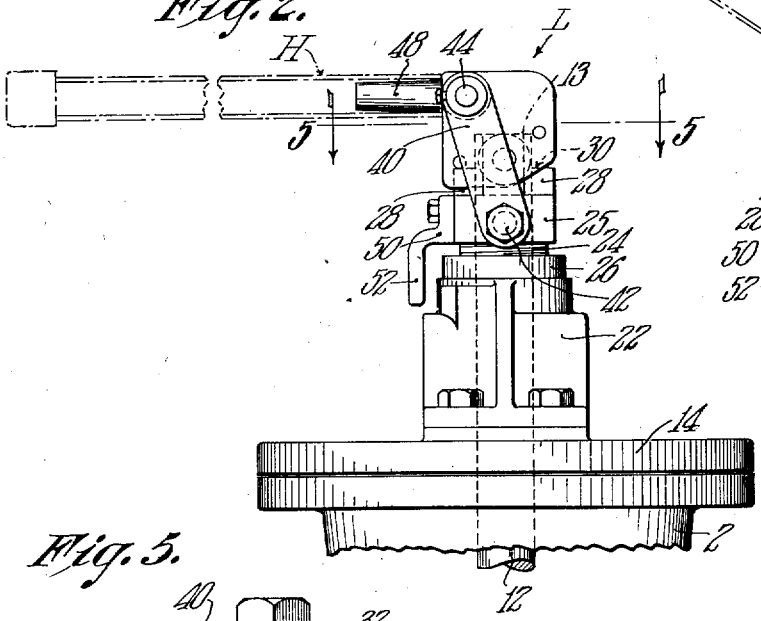
Fig. 2 is a side elevational view of the upper side of the valve shown in Fig. 1.

The upper end of the stem or spindle 12 is reciprocable in the sleeve 24. By particular reference to Fig. 5 it will be noted that the upper extremity 13 of the stem is flattened off at its sides. Ledges 28 extend upwardly from a head 25 of the sleeve 24 at opposite sides of the stem to provide substantially horizontally disposed shoulders 30 (see Figs. 2 and 5).

Figure 5:
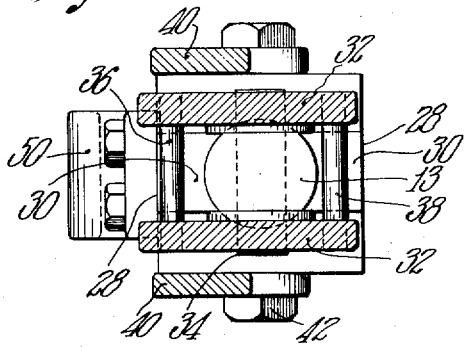
Fig. 5 is a sectional view on the line 5—5 of of Fig. 2.

A lever L has lower cheek parts 32 which are spaced apart and these are disposed adjacent the flattened sides of the upper end of the stem (see Figs. 1 and 5). The lever L is pivoted to the upper end of the stem as by a pin 34 which extends through the cheeks of the lever and extremity of the stem 13. This is so the lever L may swing on the stem while at the same time it functions to rotate the stem and thereby the plug all as will hereinafter appear.

Stops 36 and 38 extend between the cheeks of the lever which are adapted to abut the upper surfaces 30 of the ledges 28 associated with the upper end of the sleeve 24.

Links 40 are pivotally connected at their lower ends to the upper end of the sleeve as by bolts 42 and their upper ends are pivotally connected to the lever L as at 44. A projection 48 extends from one side of the lever L to facilitate swinging of the said lever and this may be relatively short so that a handle in the form of a pipe H may be slipped thereover to provide leverage. It will be obvious that the projection may extend from any side of the lever depending upon the particular requirements.

A stop member 50 having a downwardly depending part 52 is carried by the head 25 of the sleeve 24. The part 52 is adapted to abut the yoke 22 at 54 thereby to limit the swinging movements of the lever L and associated parts so that the plug 6 may be positioned in a full open or closed position.

As has been explained the plug and its stem are reciprocable and rotatable so that the plug may be elevated from a seated position shown in Fig. 1 to an unseated position and then rotated to another position such as its open or intermediate position and then reseated in this latter position.

Figure 3:
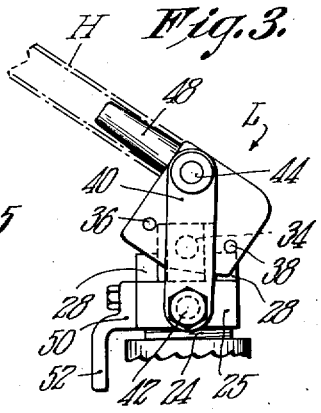
Fig. 3 is a fragmentary view of the plug operating mechanism of the valve shown in Fig. 2 with the parts in a different position than in Fig. 1.

Figs. 1 and 3 show the position of the lever L with plug in its closed, seated position. To move the plug to an open position, the lever L is rotated counterclockwise from the position shown in Fig. 3 so that it assumes the position shown in Fig. 2. This initial swinging of the lever causes the upper pivotal connection of the links and lever L to pass counterclockwise through the vertical axis of the stem or to the left thereof whereby the stem is elevated to elevate and move the plug from its seated relation in the body.

When the lever has been moved to a non-seated position of the plug the stop 36 abuts the upper side of the part 28 of the sleeve to prevent the further swinging of the levers counterclockwise while the spindle and plug are free for rotation to locate the plug in full open or at some intermediate throttling position. With the plug in full open position the stop part 52 will bring up against one of the stops 54 on the yoke.

After the plug has been moved to an open position it is desired to reseat or wedge the plug in said position. This is accomplished by swinging the lever L clockwise from the position shown in Fig. 2 so that the pivotal connection between the links 40 and lever L swings towards and slightly past the vertical axis of the stem whereupon the stop 38 abuts the upper side of the part 28. This pin 38 is so arranged relative to the part which it abuts that the pivotal connection 44 passes just slightly beyond the vertical axis of the stem whereby the plug is forced downwardly by the stem and is releasably locked by a toggle action in a seated or wedged position.

Figure 6:
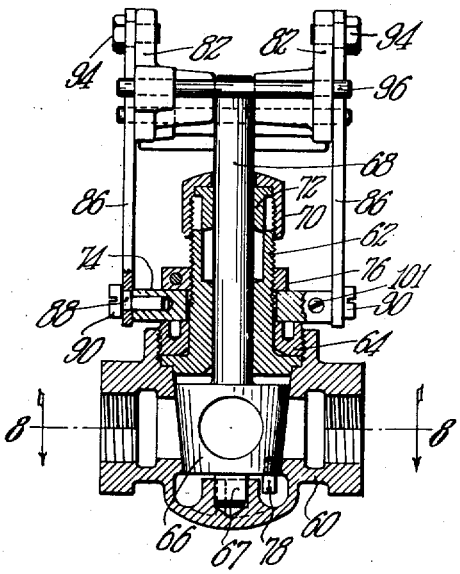
Fig. 6 is a view similar to Fig. 1 showing a modified form of the invention.
Figure 7:
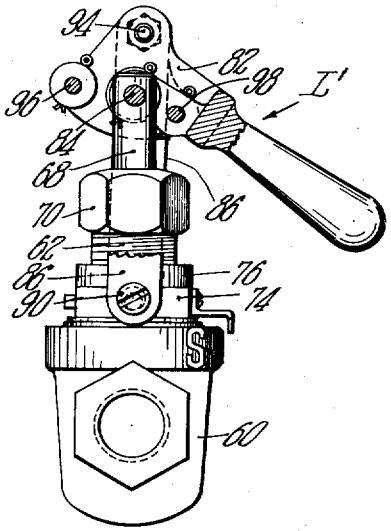
Fig. 7 is a side elevational view of the valve shown in Fig. 6.
Figure 8:
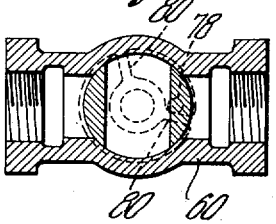
Fig. 8 is a sectional plan view on the line 8—8 of Fig. 6.

The form of the invention shown in Figs. 6 to 8 inclusive, will now be described in detail.

A body 60 has a tubular member 62 at its upper side which may be held in place by a member 64 in screw-threaded engagement with the body. A plug 66 has a part 67 at its lower end suitably journalled in the body and a stem 68 at its upper side is reciprocable and rotatable in the part 62.

The upper end of the part 62 is threaded, as shown, and a cap nut 70 and gland 72 provide a means for packing the stem as is usual in valve structures.

A collar block 74 is rotatable on the part 62 and it is held against movement upwardly by a collar 76. A stop pin 78 on the lower end of the plug is arranged to abut ribs such as 80 in the body to limit swinging movements of the plug to its full open or closed positions.

A lever L′ has separated parts 82 at its upper end which are pivoted as by pin 84 to the upper end of the stem. Links 86 have their lower ends pivoted on eccentrically disposed parts 88 of pivot pins 90 associated with blocks 74 and their upper ends are pivotally connected at 94 to the cheeks 82 of the lever. Stop pins 96 and 98 extend between the cheeks of the lever and are adapted to abut the sides of the stem to limit the movement of the lever L′.

As with the form of the invention previously described, the plug is elevated from seated or wedged position, rotated and then reseated again. For instance, from the closed seated position shown in Fig. 6, the plug is elevated to non-seated position by swinging lever L′ counterclockwise and then the lever is rotated to rotate the stem and plug to position the plug in a full open or an intermediate position. When the plug is positioned as desired it is reseated by swinging the lever clockwise. Also, as in the former case, when the lever swings to the plug seating position as in Fig. 7, the pivotal connection associated with the upper ends of the links and levers passes across the vertical axis of the stem and slightly beyond so that the links and the pivotal connections with the lever, stem and associated parts operate with a toggle action to releasably lock the lever and thereby the plug in its seated or wedged position.

In order that the plug may be tightly wedged or seated in the body in its wedged position the pins 90 may be rotated to vary the position of their eccentric parts thus raising and lowering the pivotal axis of the lower ends of the links 86.

Having described the novel valve structure it will be appreciated that various changes and modifications may be made in the form thereof without departing from the spirit and scope of the invention.

What it is desired to claim and secure by Letters Patent of the United States is:

1. A valve apparatus comprising in combination, a body, a conical plug reciprocable and rotatable therein, means to reciprocate the plug from seated to non-seated position and rotate the plug between open, closed and intermediate positions and then to reseat said plug, the said means including a stem fixed to said plug, a lever pivotally connected to said stem and a link pivotally connected to said body at its lower end with its upper end pivotally connected to said lever, and the said pivotal connections being relatively disposed to provide a releasable toggle lock for the plug when the lever is in a certain position.

2. A valve apparatus comprising in combination, a body having a plug bore intersecting a passageway therethrough, a plug provided with a passageway which is reciprocable in the bore between seated and non-seated positions and rotatable in non-seated position, a guide member rotatable on said body, a stem associated with said plug reciprocable therein, an operating lever, connecting means between said guide, stem and lever for rotating the guide and reciprocating the stem by the said lever, the said connecting means including pivotal connections between said lever, stem and guide, and means to adjust said guide up and down to adjust the plug relative to its bore in seated position.

3. A valve apparatus comprising in combination, a body having a plug bore intersecting a passageway therethrough, a plug provided with a passageway which is reciprocable in the bore between seated and non-seated positions and rotatable in non-seated position, a guide member rotatable on said body, a stem associated with said plug reciprocable thereon, an operating lever, connecting means between said guide, stem and lever for rotating the guide and reciprocating the stem by the lever, the said connecting means including a link and pivotal connections between the ends of said link and the said lever and guide and a pivotal connection between said lever and stem disposed between the pivotal connections at the ends of the link, and stops to limit swinging movements of said lever, the said pivotal connections being relatively disposed to provide a releasable toggle lock whereby the lever may be releasably locked with a toggle action with the plug in seated position.

4. A valve apparatus comprising in combination, a body, a conical plug reciprocable and rotatable therein, means to reciprocate the plug from seated to non-seated position and rotate the plug between open, closed and intermediate positions and then to reseat said plug, the said means including a stem fixed to said plug, a lever pivotally connected to said stem for swinging movements, a link pivotally connected to said lever and body, means to limit the swinging movements of said lever, and the said pivotal connections being relatively disposed to provide a releasable toggle lock for the plug when the lever is in a certain position.

5. A valve apparatus comprising in combination, a body, a conical plug reciprocable and rotatable therein, means to reciprocate the plug from seated to non-seated position and rotate the plug between open, closed and intermediate positions and then to reseat said plug, the said means including a reciprocable and rotatable stem fixed to said plug, a lever pivotally connected to said stem for swinging movements, a link pivotally connected to said body at its lower end with its upper end pivotally connected to said lever, means to limit rotative movements of said stem, means to limit swinging movements of said lever, and the said pivotal connections being relatively disposed to provide a releasable toggle lock for the plug when the lever is in a certain position.

6. A valve apparatus comprising in combination, a body having a plug bore, a plug reciprocable in the bore between seated and non-seated positions and rotatable between open and closed positions, a guide member rotatable relative to the body having an axial bore, a stem associated with the plug reciprocable in the bore of the guide member, a lever pivotally mounted for swinging movements on the stem, links at opposite sides of the lever having their upper and lower ends pivotally connected to the lever and guide respectively above and below the pivotal connection of the lever and stem, and the said pivotal connections being relatively disposed to provide a releasable toggle lock when the said lever is in a certain position.

7. A valve apparatus comprising in combination, a body having a plug bore, a plug reciprocable in the bore between seated and non-seated positions and rotatable between open and closed positions, a guide member rotatable relative to the body having an axial bore, a stem associated with the plug reciprocable in the bore of the guide member, a lever pivotally mounted for swinging movements on the stem, links at opposite sides of the lever having their upper and lower ends pivotally connected to the lever and guide respectively above and below the pivotal connection of the lever and stem, the said pivotal connection being relatively disposed to provide a releasable toggle lock when the said lever is in a certain position, and means for adjusting the said guide axially of said stem and relative to the body.

8. A valve apparatus comprising in combination, a body having a plug bore, a plug reciprocable and rotatable therein, a guide member rotatable on said body, a stem extending from said plug through said guide, a lever having spaced parts at opposite sides of said stem, a pivotal connection between said parts and stem, links pivotally connected to opposite sides of said guide, pivotal connections between said links and guide and between said links and lever above and below the pivotal connection between said stem and lever parts, the said pivotal connections being relatively disposed to provide a releasable toggle lock for the lever when in a certain position.

9. A valve apparatus comprising in combination, a body having a plug bore and a plug rotatable and reciprocable therein, a guide member rotatable relative to the body, a stem member affixed to said plug extending therethrough, a lever having spaced parts at either side of the stem, a pivotal connection between the stem and said parts, means associated with said parts of the lever engageable with one of said members to limit swinging movements of said lever, links pivotally connected at upper and lower ends to the lever parts and guide member above and below the pivotal connections between the lever parts and stem, and the said pivotal connections being relatively disposed to provide a releasable toggle lock for the lever in a certain position.

10. A valve apparatus comprising in combination, a body, a conical plug reciprocable and rotatable therein, a stem on said plug, a lever pivoted to said stem for swinging movements in a vertical plane, a link pivotally connected at its upper end to said lever above the pivotal connections of the said lever and stem and pivotally and rotatably connected at its lower end to said body, the said connections being relatively disposed to provide a releasable toggle lock for the plug when the lever is in a certain position, means to limit relative swinging movements of said lever and means.

11. A valve apparatus comprising in combination, a body, a plug reciprocable and rotatable therein having a stem member, means to reciprocate said plug and stem between seated and non-seated positions and to rotate the same between open, closed and intermediate positions including an operating lever member, a member rotatable relative to said body, means holding the same against axial movements; a connector for connecting certain of said members, and pivotal connections between said lever, connector, stem, and rotatable member operatively connecting the same, the said pivotal connections being on parallel axes disposed angularly relative to the axis of rotation of the rotatable member whereby the operating lever may swing up and down to reciprocate said stem and plug.

12. A valve apparatus comprising in combination, a body, a plug reciprocable and rotatable therein having a stem member, an operating lever member, a connecting link member, and pivotal connections between opposite ends of said link member, body, lever and stem members arranged whereby said lever member, connecting link and stem members may move relative to one another in parallel planes and disposed in parallelism to provide a releasable toggle lock when the lever member is in a certain position.

13. A valve apparatus comprising in combination, a body, a plug reciprocable and rotatable therein having a stem member, an operating lever member, connecting link members, and pivotal connections between opposite ends of said link members, body, lever and stem members arranged whereby said lever, link and stem members may move relative to one another in substantially parallel planes and disposed in parallelism to provide a releasable toggle lock when the operating lever member is in a certain position.

14. A valve apparatus comprising in combination, a body, a plug reciprocable and rotatable therein having an upwardly extending stem member, a member rotatable relative to said body and stem members, an operating lever member, connecting link members separate from the rotatable member, and pivotal connections between opposite ends of the link members, rotatable member, lever member and stem member arranged to facilitate relative swinging movements of said lever, rotatable member, stem and link members in parallel planes relative to one another and disposed in parallelism to provide a releasable toggle lock when the lever member is in a certain position.

15. A valve apparatus comprising in combination, a body, a plug reciprocable and rotatable therein having an upwardly extending stem member, an operating lever member, a member rotatable relative to the body and stem members, connecting link members, and pivotal connections between opposite ends of said link members, lever member and stem member arranged to permit relative swinging movements of said lever, rotatable member, stem and link members in parallel planes and disposed in parallelism to provide a releasable toggle lock wherein the lever member is releasably locked in a certain position.

DAVID D. GOLDBERG.
AARON R. KLIGMAN.